United States Patent [19]

Ferguson et al.

[11] 4,268,210

[45] May 19, 1981

[54] PALLET UNLOADER FOR FORK LIFTS

[75] Inventors: Charles O. Ferguson; John W. Ferguson, both of South Bend, Ind.

[73] Assignee: Ferguson Welding and Spring Fabrication, Inc., South Bend, Ind.

[21] Appl. No.: 21,923

[22] Filed: Mar. 19, 1979

[51] Int. Cl.³ .............................................. B60P 1/00

[52] U.S. Cl. .................................... 414/497; 414/661

[58] Field of Search ............... 414/497, 704, 661, 417, 414/513, 785, 607, 492, 493; 198/734, 749, 746

[56] References Cited

U.S. PATENT DOCUMENTS

| | | | |
|---|---|---|---|
| 2,787,393 | 4/1957 | Horton | 414/661 |
| 3,059,796 | 10/1962 | Dansereau | 414/661 |
| 3,182,836 | 5/1965 | Sinclair | 414/661 |
| 3,640,414 | 2/1972 | Brudi | 414/661 |
| 3,788,507 | 1/1974 | Voss | 414/497 X |
| 3,850,115 | 11/1974 | Mackes | 414/661 X |

FOREIGN PATENT DOCUMENTS

| | | | |
|---|---|---|---|
| 1556039 | 9/1969 | Fed. Rep. of Germany | 414/497 |
| 152626 | 5/1962 | U.S.S.R. | 414/661 |

*Primary Examiner*—Stephen G. Kunin
*Assistant Examiner*—L. E. Williams
*Attorney, Agent, or Firm*—Marmaduke A. Hobbs

[57] ABSTRACT

An unloading mechanism for fork lifts in which a plate slides over the pallet on a fork lift and pushes the goods off the pallet. The plate is moved across the pallet by two arms connecting the plate to the fork lift and operated by a hydraulic cylinder. Pivotal connection of the plate to the arms permits continuous vertical positioning of the plate during its movement forwardly to remove the goods, the rollers may be used to support the plate and arms on the pallet and to prevent damage to the pallet.

7 Claims, 9 Drawing Figures

PALLET UNLOADER FOR FORK LIFTS

Goods, merchandise and other products, such as, for example, rolls of sod, are frequently stacked on pallets for ease in handling during delivery and storage. Large quantities can be stacked on a single pallet, which in turn can be handled by a fork lift truck to load and unload delivery trucks and move the items in a warehouse or other storage facility. In this way, large quantities can be handled in a short period of time by one man using a fork lift truck. In the typical purchaser/supplier relationship, the goods are left on the pallet at delivery, and are later unloaded as the products are used. The loaded pallets left at the time of delivery are usually picked up at a subsequent delivery when they have been unloaded. This normally is no problem when regular deliveries are made to the same site; however, difficulties do arise in some industries, such as sod suppliers, which normally make only one delivery to a particular delivery site. Frequently all deliveries are made before any of the sod is unloaded as it is laid. A return trip by the sod supplier is then required to pick up the empty pallets. This practice is uneconomical in that it ties up the truck in making a second trip to the site to pick up the empty pallets, or else subsequent deliveries to nearby sites must be coordinated with pick-up times at earlier delivery sites to minimize empty runs by the truck. Often, because of inconvenience, the return trip to pick up the pallets is not made promptly, and many pallets are lost, stolen or destroyed, or simply forgotten about and never picked up. Hence, substantial costs are incurred in replacing the lost pallets, or an excess investment in pallets may be required in order to have pallets available so that deliveries can be continued without interruption before the pallets left at various job sites for unloading are picked up. Further inconvenience is also caused at the delivery site where the empty pallets must be handled and stored until they are eventually picked up.

The only satisfactory alternative to this has been to unload the pallets immediately upon delivery. Since previously the unloading had to be done by hand, substantial time was lost simply to be able to recover the empty pallets immediately. For this reason this alternative has not been extensively used. Inasmuch as the one-time deliveries are usually made to locations where a fork lift truck is not readily available, the supplier most often furnishes a fork lift to facilitate unloading of the truck. It is therefore one of the principal objects of the present invention to provide an unloading device for fork lift trucks which can easily and quickly unload the pallets when delivery is made so that the pallets may be returned immediately, thereby eliminating the necessity for a large investment in an excessive number of pallets, and reducing the loss or theft of pallets and the cost incurred for their replacement.

Another object of the present invention is to provide an unloading device for fork lifts which is simple in design and compact so as to require a minimum amount of space without substantially enlarging the overall size of the fork lift, yet which has sufficient power and unloading force to be able to unload heavy, loosely stacked goods from the pallets, but which does so in a gentle manner without damaging the goods.

A further object of the present invention is to provide an unloading device for fork lift trucks which can be readily modified to be used on any conventional type fork lift, and which is designed to ride on or over the top of a pallet without causing any damage to the pallet, and which in its retracted position does not interfere with the conventional operation and use of the fork lift.

A still further object of the present invention is to provide an unloading device for fork lift trucks which has an expandable push plate that can be extended to cover wide pallets, but when not extended is no wider than the fork lift itself, and which push plate remains essentially vertical as it moves across the pallet, thereby providing a vertically positioned, flat pushing surface which will not damage the goods being unloaded.

Further objects and advantages of the present invention will become obvious from the following detailed description and drawings wherein.

Figure 1:
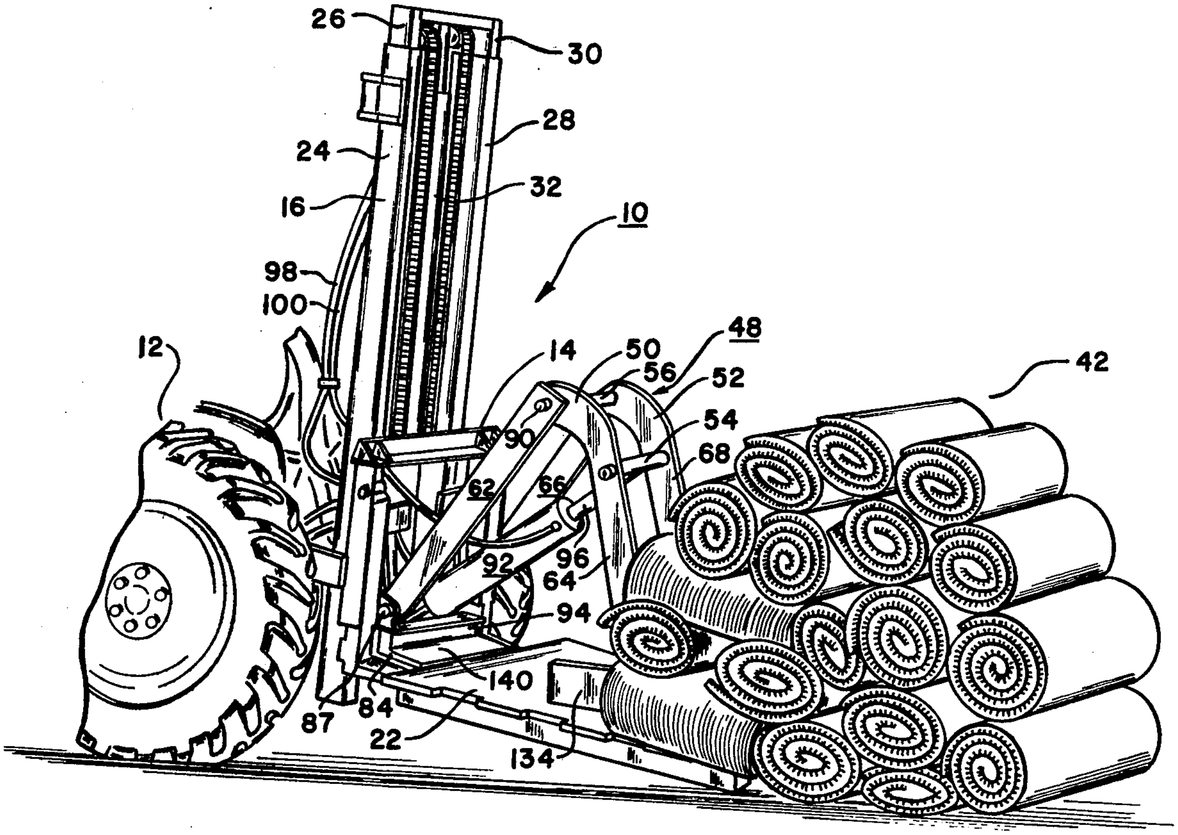
FIG. 1 is a perspective view of a fork lift mounted on the rear of a tractor and having the present pallet unloader thereon, the figure showing the manner in which the unloader operates to remove a load from a pallet.

Referring more specifically to the drawings, and to FIG. 1 in particular, numeral 10 indicates generally a fork lift mounted on the rear end of a conventional farm tractor 12 and having a carriage 14 disposed on an upright 16, the carriage including a pair of forks 18 and 20 for engaging and lifting a pallet 22. The upright has telescopic members 24 and 26 on one side and 28 and 30 on the other side which are operated by a hydraulic cylinder 32. The carriage is moveable vertically on the upright in the conventional manner under power to various positions for loading and unloading the forks. In the embodiment illustrated, the fork lift is mounted on the rear of the tractor; however, for convenience of description, the carriage side of the fork lift, including the free ends of the forks, will be referred to as the forward end of the fork lift unit. Various types of vehicles other than tractors may be used, and a special vehicle may be constructed for use with the present pallet unloading fork lift.

The pallet 22 is normally constructed of wood and consists of longitudinal runners 34, 36 and 38 and a series of boards 40 nailed or otherwise secured crosswise thereon, providing spaces 41 for receiving the forks as the lift picks up the pallet with a load thereon. For use with the present invention, the upper surface of the pallet is preferably smooth and may contain a layer of plywood, plastic or metal to facilitate slippage of the load on the pallet when the load removal operation is being performed. In the embodiment of FIG. 1 the load is illustrated as a stack 42 of rolls of sod which are being delivered to a site for a new lawn.

Figure 2:
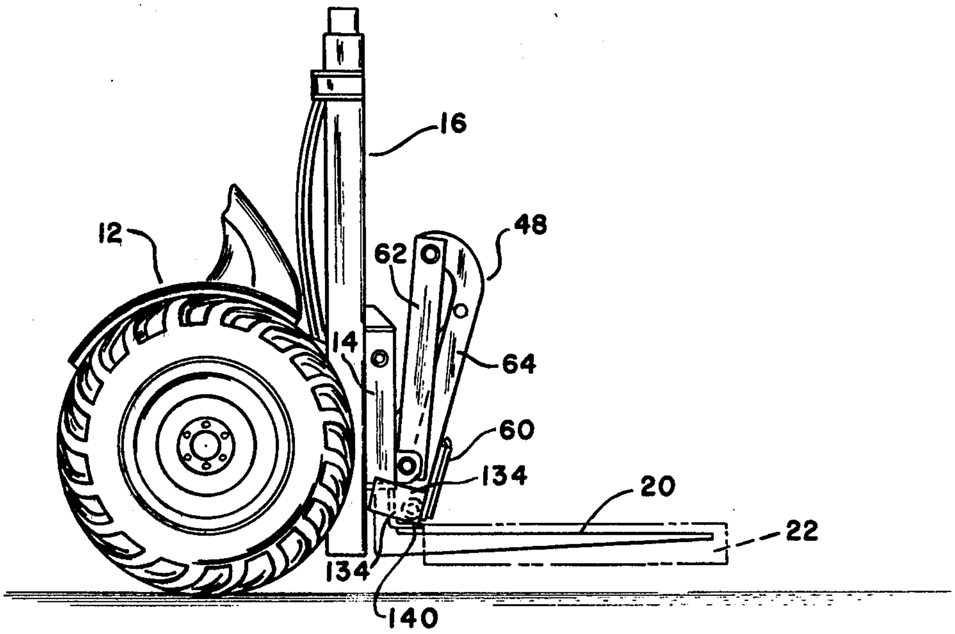
FIG. 2 is a side elevational view of the fork lift and unloader as shown in FIG. 1.
Figure 3:
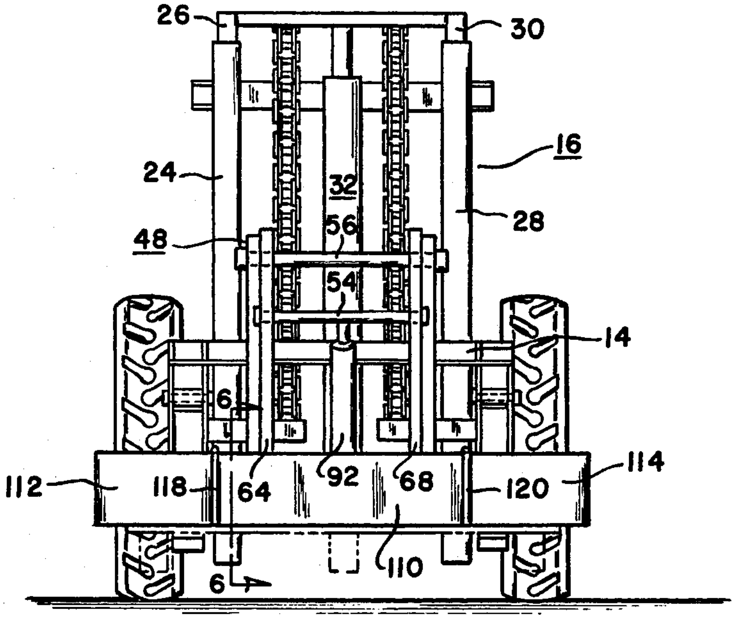
FIG. 3 is an elevational view of the fork lift and unloader shown in FIGS. 1 and 2.
Figure 4:
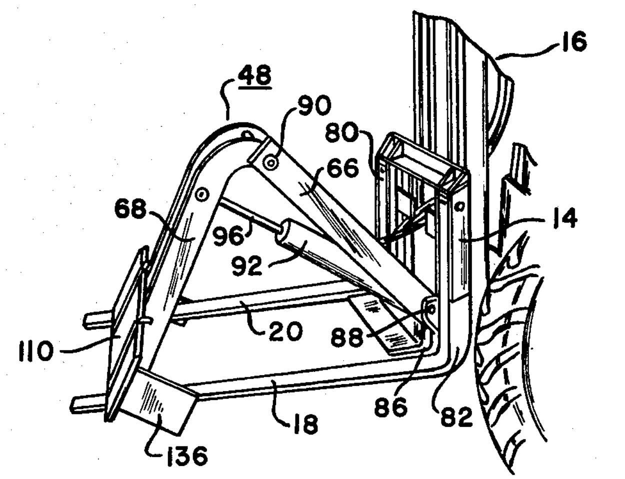
FIG. 4 is a perspective view of a fork lift with the present unloader mounted thereon, showing the unloader in its extended position.

The pallet unloader 48 includes a pair of spaced arms 50 and 52 joined together by a plurality of rigid spacers 54 and 56 and by a load push plate 60 mounted on the forward end of the two arms. Arm 50 includes a rear section 62 and a forward section 64 and arm 52 includes a rear section 66 and a forward section 68, the two forward sections being pivotally connected to load push plate 60 by brackets 70 and 72 and pins or shafts 74 and 76. The rear sections 62 and 66 are pivotally connected to rigid vertical members 80 and 82 of the carriage by brackets 84 and 86 and pins 87 and 88, respectively. The two arm sections of each arm are pivotally connected by shaft 90, and the arms are extended and contracted between the retracted position illustrated in FIG. 2 and the extended position of FIG. 4, by a hydraulic actuator such as a hydraulic cylinder 92, the support rod of which is pivotally connected at its lower end to rigid bar 94 of the carriage, and the piston rod 96 of which is connected to spacer bar 54 between forward arm sections 64 and 68, the bar 54 being adapted to pivot or rotate when the piston is actuated. The hydraulic cylinder is preferably a double acting cylinder operated by the hydraulic system of the tractor through hydraulic lines 98 and 100.

Figure 5:
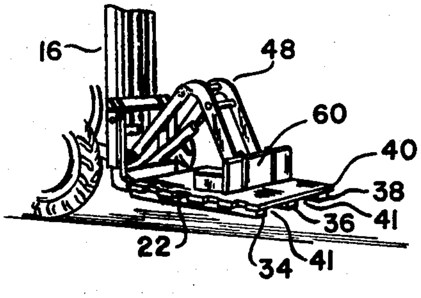
FIG. 5 is a perspective view of the fork lift and unloader shown in the preceding figures, with an empty pallet mounted on the fork lift to illustrate the manner in which the unloader operates.
Figure 6:
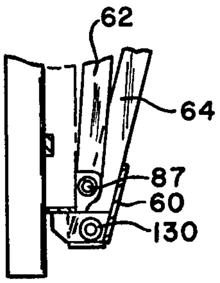
FIG. 6 is a fragmentary cross sectional view taken on line 6—6 of FIG. 3, showing the unloader in its retracted position.
Figure 9:
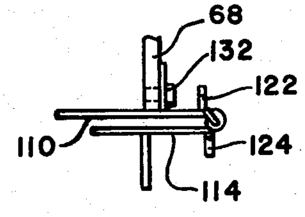
FIG. 9 is a fragmentary plan view of a portion of the front end of the unloader.
Figure 7:
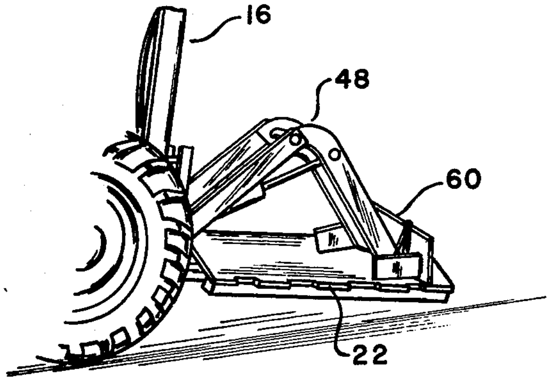
FIG. 7 is another perspective view of the fork lift and unloader, similar to that shown in FIG. 5 but viewed from a different angle.
Figure 8:
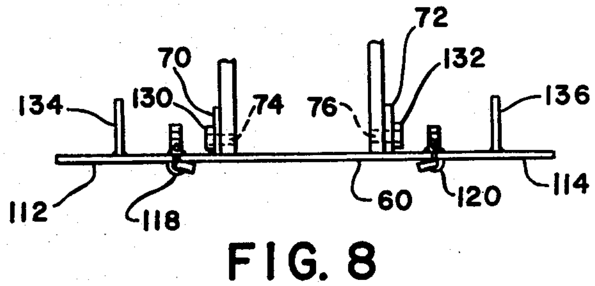
FIG. 8 is a fragmentary top plan view of the front end of the unloader.

The load push plate 60 consists of a center plate section 110 and two side sections 112 and 114, the two side sections being pivotally connected to the center section by hinge means 118 and 120 so that the two outer sections 112 and 114 can fold inwardly from a position parallel to the center section to an overlapping position in front of the center section as illustrated in FIG. 9 in which section 114 is shown pivoted inwardly to a position in front of center plate 110. Lugs 122 and 124 on center section 110 and side sections 112 and 114 form stops for the side sections to retain them in a lateral position when they have been extended. The forward ends of the two arms are supported on the pallet or on the forks by rollers 130 and 132 rotatably mounted on pins 74 and 76. Thus the two arms move freely inwardly and outwardly either along the upper surface of the pallet or along the upper surface of the forks as the hydraulic cylinder extends and contracts the two arms. The load push plate is held in a substantially vertical position when pushing a load from the upper surface of the pallet by guide members 134 and 136, consisting preferably of plates rigidly secured to the rear side of side members 112 and 114. The lower edges of the two guide members ride on the upper surface of the pallet to tilt the load push plate from the position shown in FIG. 4 to the position shown in FIGS. 5 and 7 where the push plate will operate more effectively to remove the load from the pallet. When the two arms have been retracted, the push plate rests on a support member 140 in the manner illustrated in FIG. 2, where the push plate of the unloader does not interfere with the proper loading and normal use of a pallet on the two forks, as well as placing the plate above the upper surface of the pallet so that when the arms are operated by the hydraulic cylinder, the push plate will move over the upper surface of the pallet.

In the operation of the present pallet unloader, sod is stacked on a pallet in the manner similar to that illustrated in FIG. 1, with the pallet preferably being of the type having a smooth upper surface of plastic, metal or plywood. Such pallets are normally loaded on trucks and the pallet unloader and tractor are transported to the place where the sod is to be laid. The pallets are then unloaded from the truck, normally using the fork lift to unload the pallets. After a pallet is unloaded from the truck, the load of stacked sod is unloaded from the pallet by the operation of hydraulic cylinder 92 which pushes arm sections 64 and 68 forwardly while arm sections 62 and 66 pivot angularly downwardly. As arm sections 64 and 68 move forwardly, push plate 60 moves along the surface of the pallet against the stack of sod rolls, pushing the stack from the pallet in the manner illustrated in FIG. 1, the push plate being held substantially in upright or vertical position by guide members 134 and 136. The pallet is prevented from moving forward when the load is being discharged, by the lowering of the pallet onto the ground or against some other obstacle where the weight of the load will prevent the pallet from moving when the two arms and push plate move the load forwardly to discharge the load from the forward end of the pallet. When the pallet is unloaded, it is either set aside or returned to the truck, and the two arms 50 and 52 are retracted to the position illustrated in FIG. 2 preparatory to unloading another pallet of sod. The unloaded pallet would normally be set aside in a stack and the stack of pallets loaded onto the truck to return to the nursery or other supplier of goods. The primary purpose for pivoting side sections 112 and 114 is to reduce the overall width of the unloader so that it can be easily transported and so that the unit will meet standards or regulations with respect to the width of the vehicle. The tractor with the lift and the unloader can then be returned to the supplier, normally by loading and transporting it on a truck.

It is seen that the present pallet unloader for fork lifts permits the normal use of the fork lift truck to handle pallets containing a load, and yet can be operated effectively from the vehicle hydraulic system to unload the pallet by pushing the load from the upper surface thereof. Once the load has been removed from the pallet, the pallet can immediately be returned to the supplier of the goods, thus avoiding the necessity of a return trip to pick up the pallets or of maintaining a large inventory of pallets for performing a number of such operations.

While only one embodiment of the present pallet unloader for fork lifts has been described in detail herein, various changes and modifications may be made without departing from the scope of the invention.

We claim:

1. An unloading mechanism for a fork lift having a carriage, comprising a push plate slidable over a pallet on the fork lift, two arms, each consisting of a first arm section and a second arm section pivotally connected to each other, the first of said arm sections being pivotally connected to the frame of the carriage, a pivot means disposed on a horizontal axis and connecting said second arm to said push plate, a power means for moving said first and second arm sections apart, pivoting them relative to each other at their connection point for sliding said push plate across the pallet, and guide members mounted on the back of said push plate and disposed inwardly from the ends thereof for engaging the pallet to maintain said push plate in a substantially vertical position as it moves across the pallet.

2. An unloading mechanism for a fork lift as defined in claim 1 in which said means for moving said first and second arm sections apart is a hydraulic cylinder pivotally attached to said second arm sections.

3. An unloading mechanism for a fork lift as defined in claim 1 in which rollers are connected to said second arm sections for rolling across the pallet when said push plate is moved by said power means.

4. An unloading mechanism for a fork lift as defined in claim 1 in which said push plate consists of a center section and opposite end sections pivotally connected to said center section, for folding laterally inwardly and outwardly.

5. An unloading mechanism for a fork lift as defined in claim 2 in which said arms have an extended position and a contracted position and when disposed in their extended position have a generally inverted V-shaped configuration.

6. An unloading mechanism for a fork lift as defined in claim 4 in which said guide members are mounted on the back of said end sections for sliding with said push plate on the pallet to maintain said push plate in a substantially vertical position as it moves across the pallet.

7. An unloading mechanism for a fork lift as defined in claim 1 in which said means for moving said first and second arm sections to move said plate consists of a hydraulic actuator and in which a support member is mounted on the carriage and one end of said hydraulic actuator is connected to said support member and the other end is connected to said second arm sections.

* * * * *